Figure 3:
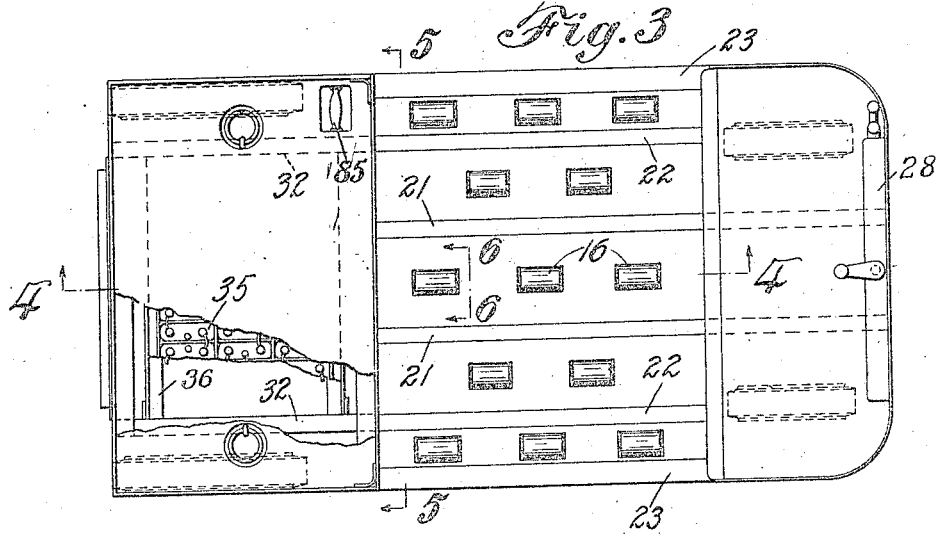

G. B. FRANCIS & B. H. SMITH.
MOTOR TRUCK.
APPLICATION FILED MAR. 13, 1911.
1,042,335.
Patented Oct. 22, 1912.
3 SHEETS—SHEET 1.
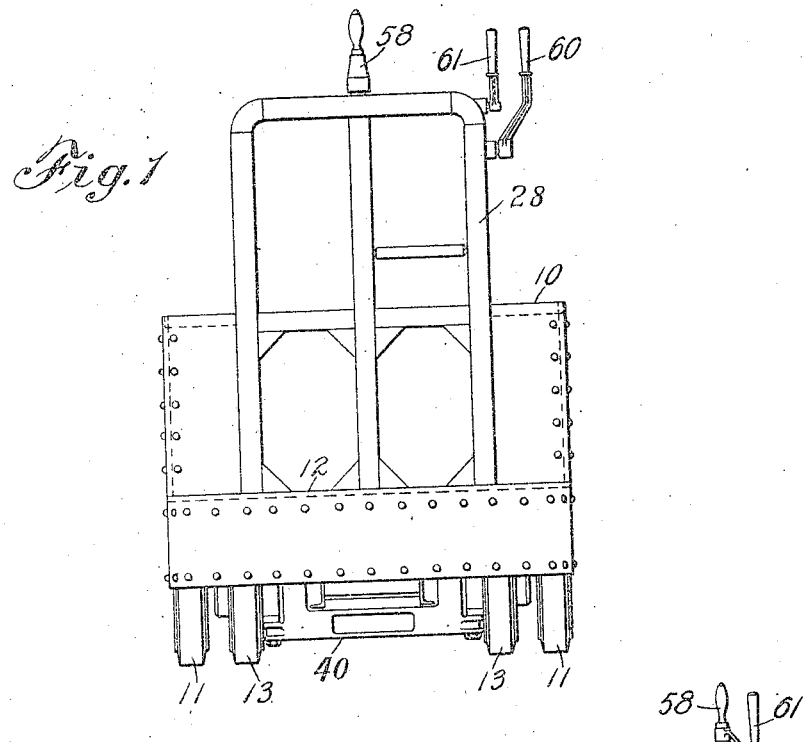
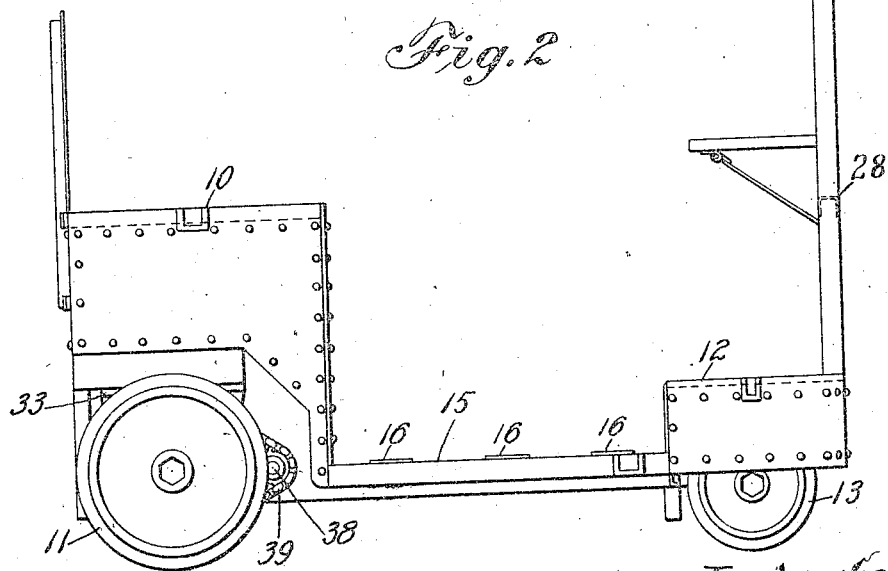

G. B. FRANCIS & B. H. SMITH.
MOTOR TRUCK.
APPLICATION FILED MAR. 13, 1911.

1,042,335.

Patented Oct. 22, 1912.
3 SHEETS—SHEET 2.

G. B. FRANCIS & B. H. SMITH.
MOTOR TRUCK.
APPLICATION FILED MAR. 13, 1911.
1,042,335.
Patented Oct. 22, 1912.
3 SHEETS—SHEET 3.
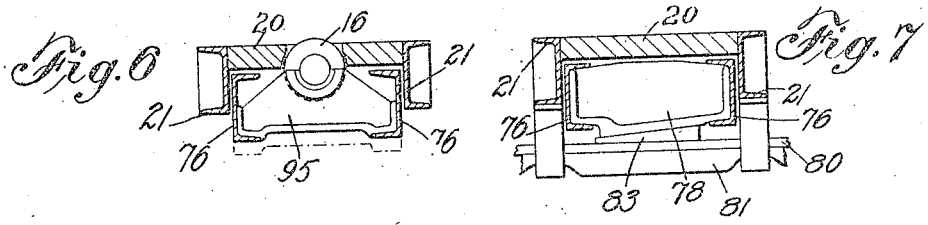
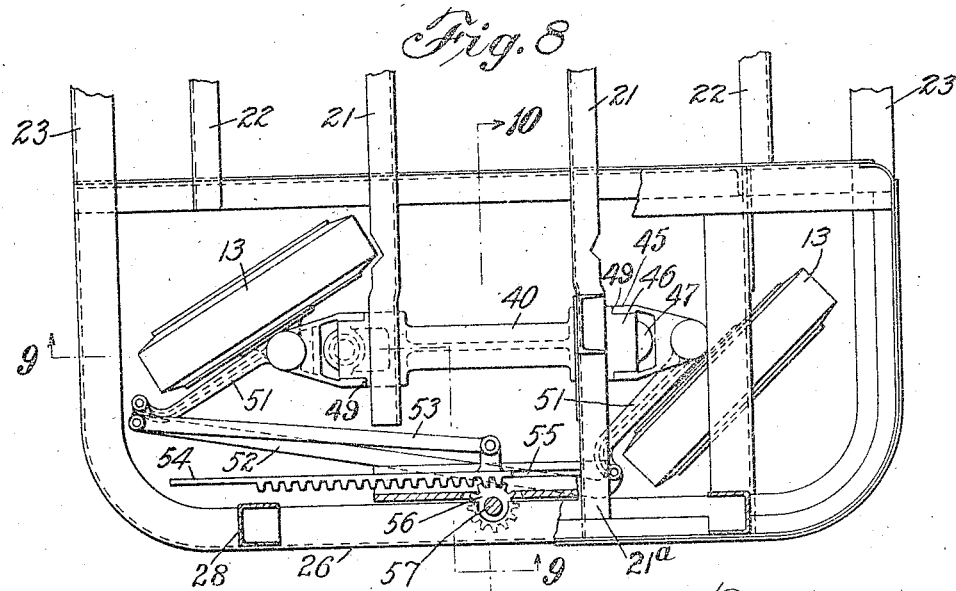
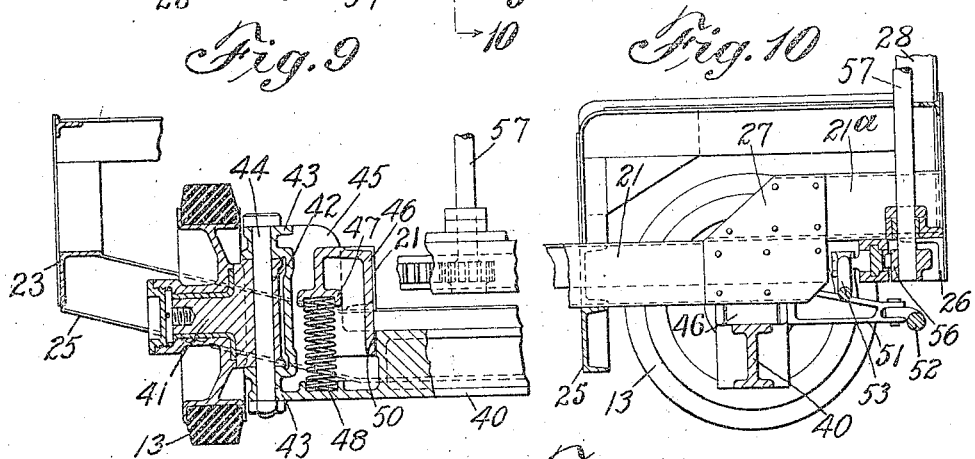
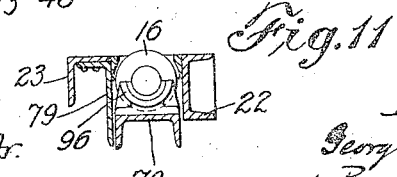
Witnesses
Frank H. Vick Jr.
L. B. Overjies
Inventors
George B. Francis
and Bronson H. Smith
By Arthur L. Kent
Their Attorneys

UNITED STATES PATENT OFFICE.

GEORGE B. FRANCIS AND BRONSON H. SMITH, OF NEW YORK, N. Y., ASSIGNORS TO WESTINGHOUSE, CHURCH, KERR & COMPANY, OF NEW YORK, N. Y., A CORPORATION OF NEW JERSEY.

MOTOR-TRUCK.

1,042,335.

Specification of Letters Patent.   Patented Oct. 22, 1912.

Application filed March 13, 1911. Serial No. 613,970.

*To all whom it may concern:*

Be it known that we, GEORGE B. FRANCIS and BRONSON H. SMITH, citizens of the United States, residing, respectively, at New York city, county of New York, and State of New York, and New York city, county of Kings, and State of New York, have invented certain new and useful Improvements in Motor-Trucks, fully described and represented in the following specification and the accompanying drawings, forming a part of the same.

This invention relates to a motor truck intended primarily for handling miscellaneous package freight. Such freight is handled at the present time in outbound and inbound freight houses mostly by means of the ordinary small hand truck having running wheels at one end and a handle by which it is supported and operated by the freight handler at the other end. Overhead or telpher carrying systems have also been tried to some extent for handling this class of freight in inbound and outbound houses, but such systems are expensive to install, require special construction of the freight houses or rearrangement of present houses, and are limited and inflexible in operation and open to other objections. The system of using hand trucks has the advantage of great flexibility, but is expensive and its capacity is limited.

The object of the present invention is primarily to provide a motor truck intended and especially adapted for use in handling package freight, and of such size and general character as to enable it to be used in place of the present hand trucks, and which, though of a size and having such freedom of movement and maneuvering as to enable it to be used wherever the present hand truck may be used, will, by reason of its greater capacity and speed, or liveliness of movement, materially increase the capacity of a freight terminal without the necessity of any special construction or reconstruction.

To this end the invention consists in an improved motor truck constructed to give great strength and capacity combined with speed and freedom of movement, and in certain features and details of the construction, all as will be hereinafter described and specifically pointed out in the claims.

The accompanying drawings show an embodiment of the invention in the preferred form.

Figure 4:
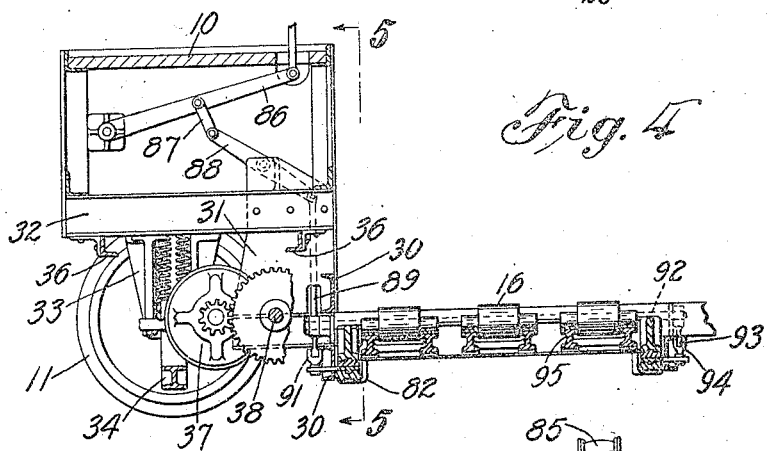
Figure 5:
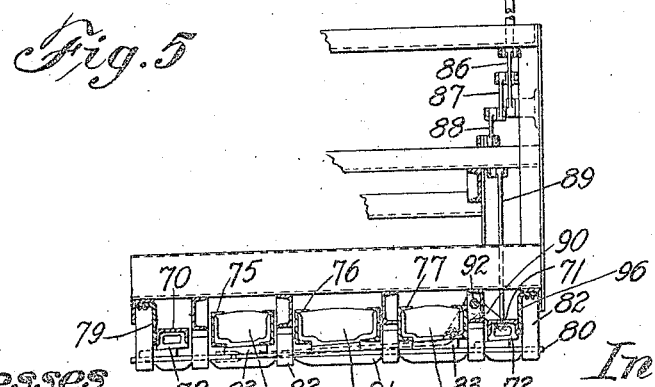

In said drawings, Figure 1 is a front elevation of the truck. Fig. 2 is a side elevation. Fig. 3 is a plan view. Fig. 4 is a section of the central and rear portions of the truck taken on line 4 of Fig. 3. Fig. 5 is a broken sectional view taken on line 5 of Figs. 3 and 4 with parts omitted. Fig. 6 is an enlarged detail sectional view on line 6 of Fig. 3, showing one of the roller mountings. Fig. 7 is a similar detail view taken on line 5 of Fig. 3 and showing one end of the central roller supporting frame with its lifting device and adjacent parts. Fig. 8 is an enlarged plan view of the front part of the machine with the platform and other parts removed to show the steering wheels and controlling connections. Fig. 9 is a section taken on line 9 of Fig. 8, but with the steering wheel shown in its straight running position. Fig. 10 is a section taken on line 10 in Fig. 8, showing the steering wheel in its straight running position. Fig. 11 is an enlarged detail section on line 11 of Fig. 3.

Referring to the drawings, the body of the machine as shown consists of a steel platform-carrying frame spring-mounted on two rear and two front running wheels. The front and rear portions of the platform are raised, the rear portion 10 to accommodate the power plant and driving gear and the driving wheels 11, and the front portion 12, to provide clearance for the steering wheels 13 and to accommodate the steering connections. The central portion 15 of the platform is hung low between the end portions to stand close to the floor and is intended for carrying the heavier packages, while the raised portions of the platform will usually be used for carrying the lighter packages. The design is such that the whole platform area is available for loading. For convenience in loading and unloading heavy packages, the central or low portion of the platform is provided with a system of depressible rollers 16 mounted to turn on axes extending longitudinally of the truck, and which, during transit, are intended to be depressed to allow the load to rest directly on the platform, but are quickly and easily raised as hereinafter described to permit heavy articles or packages to be rolled on to or off the platform in the direction crosswise of the machine.

The main frame or structure of the truck is as shown of angle bar construction. The central low hung portion of the frame is formed by a number of longitudinal beams which carry the central platform flooring 20 and include two inner channel bars or beams 21, two intermediate channel beams 22, and two outer or side angle bar beams 23. These beams are connected at the front end of the central platform by a transverse channel bar 25 which dips from the side beams toward the center to pass under the beams 21. The angle bars forming the side beams 23 extend forward beyond the cross piece 25 and turn inward to connect across the front of the truck forward of the steering wheels to form a lower front cross piece 26. The beams 22 end at the cross piece 25 to leave a free turning space for the steering wheels, but the inner beams 21 extend forward to connect with the cross piece 26. To give space for the steering connections, the front ends of the beams 21 are raised by having, in the construction shown, the channel bars forming the main portions of the beams end short of the front of the machine and continued by short channel bars 21ª secured to the main channel bars by plates 27. A vertical frame 28 extends above the front platform at the extreme front of the truck body and carries the control handles. The front platform flooring is supported by suitable framing and the space beneath the flooring is inclosed down to the side bars 23 and cross piece 26 by side plating, forming a protecting housing for the steering wheels and steering connections.

At the rear end of the central platform, the platform beams are connected by upper and lower transverse channel beams 30, the inner platform beams and the outer platform beams ending at these cross beams and the intermediate platform beams 22 extending between and to the rear of the beams 30 and being connected by upwardly extending plates 31 to the forward ends of channel beams 32 which carry the depending pedestals 33 for the driving wheel axle beam 34 and support the rear housing of the truck and the inclosed power plant and driving connections. The front of the rear platform structure and the sides and back above the wheels are inclosed by metal plating. The truck shown by the drawings is electrically driven, the power plant consisting of a suitable storage battery 35 set beneath the rear platform flooring on supporting bars 36 carried by the beams 32 and an electric motor 37 hung from the beams 32 beneath the battery and geared direct to a counter shaft 38 provided with the usual differential gear and connected at each end with the driving wheels through sprocket chains 39 as indicated in Fig. 2. The rear platform flooring is made removable so that the battery boxes may be readily lifted out and placed in position.

The steering wheels 13 are knuckle-jointed to the front axle beam 40, the hub of each wheel being mounted to turn on a spindle 41 carried by a vertical sleeve or knuckle piece 42 which enters between projections 43 extending from the end of the axle beam and is pivotally connected thereto by a knuckle pin 44. To afford a strong compact spring connection between the axle beam 40 and the body of the truck, and to permit the wheels to swing through a long arc, the beam has its ends just inside the knuckle joints formed to provide a space or pocket between vertical side walls 45 to receive hollow guide blocks 46 secured to the channel beams 21 and formed each with a spring seat 47 for the upper end of a coiled spring 48, the lower end of which rests in a seat on the bottom of the axle beam between the side walls 45. Each of the guide blocks has vertical sides forming front and rear guiding faces to co-act with the vertical guiding faces of the side walls 45 of the axle beam, and the guide blocks also have shoulders 49 forming vertical outwardly facing guide faces to co-act with the inwardly facing edges or faces of the side walls 45 of the axle beam. Each guide block is also formed with an inwardly facing lower guiding face 50 to co-act with a corresponding guiding face on the axle beam as shown in Fig. 9. The axle beam will thus be securely guided and held against turning during the relative vertical movement between the axle beam and wheels and the truck frame.

Each knuckle piece 42 carries a forwardly extending arm 51 and the two knuckle arms are connected by a cross link 52, the ends of the arms being turned outward so that the radial lines from the vertical axes about which the wheels swivel to the point of pivotal connection between the arms and link 52 will slant outwardly relatively to the plane of rotation to the wheels, in the customary manner, so that when the wheels are swung on their knuckle joints from the straight position the inner wheel will be given the greater movement and the wheels will always stand with their axes in lines converging to a common point in the line of the axis of rotation of the rear wheels. The wheels are controlled for steering through a link 53 connected at one end to the link 52 and at the other end to a horizontal rack 54 mounted to move in a guide way 55 secured to the under side of the beam ends 21ª. The rack is reciprocated by means of a pinion 56 on the lower end of a vertical shaft 57 which extends upward within the central post of the front frame 28 and carries at its upper end a steering arm and handle 58. The frame 28 also carries a brake handle 60 which will be connected to operate suitable brake mechanism, and a motor controller handle 61.

The depressible rollers 16 of the central low platform are mounted to project when elevated through openings in the platform flooring. In order to provide for the raising and lowering of these rollers without unduly increasing the thickness of the platform and thereby increasing the height of the platform flooring, the rollers are divided into sets and each set is carried by a frame mounted to move vertically between two of the platform beams. As shown in the drawings, five such roller carrying frames are provided. The two outer frames 70 and 71 are formed by inverted channel bars extending the length of the platform and each provided at each end with a supporting block 72. The other three roller carrying frames 75, 76 and 77 are each formed of two channel bars set with their recessed sides facing and connected at their ends by supporting blocks 78. The inner roller frames 75, 76 and 77 have their channel bars set such distance apart as to fit easily between and to be guided in their upward and downward movement by the platform beams between which they are placed, and the outer frames 70 and 71 are similarly guided between the platform beams 22 and guide plates 79 depending from the side bars or beams 23 of the platform.

For supporting and raising and lowering the roller carrying frames, there is provided at each end of the low central platform an endwise movable bar 80 which is mounted to slide on a way formed by a bar 81 hung beneath the platform beams at the end of the platform by brackets 82. The bars 80 carry or have formed thereon a number of inclined supports or wedges 83, one for each of the roller carrying frames, and on which the correspondingly inclined under faces of the supporting blocks 72 and 78 rest. The wedge carriers or bars 80 are reciprocated endwise by means of a handle 85 extending upward through a hole in the rear platform flooring at one side of the machine from a lever 86 which is connected by a link 87 with a lever 88, which in turn is connected by a vertical link 89 with one arm of a bell-crank lever 90 the other arm of which is connected by a horizontally extending link 91 with a pin or arm projecting from the rearmost wedge carrier. The bell crank 90 is fast on a rock shaft 92 which extends longitudinally of the machine in the recess of one of the platform beams 22 and carries at the front of the platform an arm 93 which is connected by a horizontally extending link 94 with a pin or stud projecting from the forward wedge carrier. When the handle 85 is raised to lift the lever 86 to the position shown in Figs. 4 and 5, the wedge carriers are, through the connections just described, moved to the position shown in Fig. 5 to lift the roller frames and cause the rollers to project slightly above the platform flooring, and when the handle is pushed downward the wedge carriers are drawn back to the right in Fig. 5, thereby moving the wedges to permit the roller frames to drop to lower the rollers below the surface of the platform flooring. The rollers may be mounted on the roller frames in any suitable manner. As shown in Fig. 4 and by the detailed view Fig. 6, the rollers carried by the inner frames 75, 76 and 77 are mounted in bearing blocks 95 which are set on the lower flanges of the channel bars of the frames and are provided with half bearings in which the roller spindles are set. The rollers carried by the outer frames 70 and 71 are similarly mounted in small bearing blocks 96 secured on the upper side of the channel bars of these frames as shown in Fig. 11.

What is claimed is:—

1. A motor truck having a low-hung central load-carrying platform, a front load-carrying platform surmounting a housing for the steering wheels and steering connections, and a rear load-carrying platform surmounting a housing for the driving wheels and power plant, the height of the front platform being intermediate that of the central and rear platforms, and the central platform being provided with depressible platform rollers mounted to turn on axes extending longitudinally of the truck.

2. In a motor truck, the combination with an axle beam, of steering wheels connected to the axle beam by knuckle joints, bearing blocks mounted on the truck frame having front and rear and side bearing faces, pockets formed in the axle beam on the inner side of the knuckle joints to receive said bearing blocks, front, rear and side bearing faces on the axle beam to engage the corresponding faces on the bearing blocks, and supporting springs in the axle beam pockets between the bearing blocks and the axle beam.

3. In a motor truck, the combination with an axle beam, of steering wheels connected to the axle beam by knuckle joints, bearing blocks mounted on the truck frame, pockets formed in the axle beam on the inner side of the knuckle joints to receive said bearing blocks, the bearing blocks and the axle beam having co-acting bearing faces for permitting relative vertical movement between said parts, and supporting springs in the axle beam pockets between the bearing blocks and the axle beam.

4. A motor truck having a central low hung platform, an elevated platform over the steering wheels, and an elevated rear platform over the driving wheels and power plant, and having a main frame comprising two inner central platform beams and two beams for the central platform outside said inner beams, cross pieces connecting said beams at each end of the central platform, the inner beams ending at the rear cross piece and extending forward of the front cross piece to support the front platform, and the other said platform beams ending at the front cross piece and extending rearward of the rear cross piece to support the rear platform and the power plant.

5. A motor truck having a central low hung platform, an elevated platform over the steering wheels, and an elevated platform over the driving wheels and power plant, and having a main frame comprising two inner central platform beams, two outer central platform beams and two intermediate central platform beams, and transverse beams at each end of the central platform, said intermediate platform beams ending at the forward transverse beam and extending rearward of the rear transverse beam to support the rear platform and power plant, and the inner platform beams and the outer platform beams ending at the rear transverse beam and extending forward beyond the forward transverse beam to support the front platform and being connected by a front cross piece.

In testimony whereof, we have hereunto set our hands, in the presence of two subscribing witnesses.

GEORGE B. FRANCIS.
BRONSON H. SMITH.

Witnesses:
W. L. MURRAY,
A. L. KENT.